United States Patent
Drescher et al.

(10) Patent No.: US 10,060,772 B2
(45) Date of Patent: Aug. 28, 2018

(54) METHOD FOR CORRECTING ERRORS IN POSITION-MEASURING DEVICES

(71) Applicant: DR. JOHANNES HEIDENHAIN GmbH, Traunreut (DE)

(72) Inventors: Joerg Drescher, Samerberg (DE); Ulrich Bichlmeier, Muehldorf (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 303 days.

(21) Appl. No.: 14/852,650

(22) Filed: Sep. 14, 2015

(65) Prior Publication Data

US 2016/0084685 A1    Mar. 24, 2016

(30) Foreign Application Priority Data

Sep. 23, 2014  (DE) .................. 10 2014 219 188

(51) Int. Cl.
*G01C 17/38* (2006.01)
*G01D 18/00* (2006.01)

(52) U.S. Cl.
CPC ........... *G01D 18/00* (2013.01); *G01D 18/008* (2013.01)

(58) Field of Classification Search
CPC ............................ G01D 18/00; G01D 18/008
USPC ......................................................... 702/94
See application file for complete search history.

(56) References Cited

U.S. PATENT DOCUMENTS

| | | | |
|---|---|---|---|
| 4,462,083 A * | 7/1984 | Schwefel | G01D 18/008 702/94 |
| 8,064,974 B2 | 11/2011 | Mannheimer et al. | |
| 2007/0058173 A1* | 3/2007 | Holzapfel | G01D 5/38 356/499 |
| 2007/0104353 A1 | 5/2007 | Vogel | |
| 2008/0105026 A1* | 5/2008 | Loopstra | G03F 9/7011 73/1.81 |
| 2013/0268226 A1 | 10/2013 | Morfino et al. | |

FOREIGN PATENT DOCUMENTS

| | | |
|---|---|---|
| CN | 1894557 A | 1/2007 |
| CN | 1947062 A | 4/2007 |
| CN | 103365246 A | 10/2013 |
| CN | 103591913 A | 2/2014 |
| EP | 0042917 A | 1/1982 |
| EP | 1403625 A1 | 3/2004 |
| EP | 1762828 A2 | 3/2007 |

* cited by examiner

*Primary Examiner* — Fernando Hidalgo
(74) *Attorney, Agent, or Firm* — Leydig, Voit & Mayer, Ltd.

(57) ABSTRACT

A method corrects errors in position-measuring devices having material measures which are scanned by at least one scanning unit. Correction values are obtained in a calibration performed prior to a measurement operation. The correction values from the calibration are compressed for the measurement operation. The correction values are kept available for a defined number of correction points on the material measure and used during the measurement operation to correct acquired position values.

15 Claims, 7 Drawing Sheets

|  | Offset | Startindex |
|---|---|---|
| Z1 | 1 | 6 |
| Z2 | 2 | 5 |
| Z3 | 4 | 4 |
| Z4 | 7 | 3 |
| Z5 | 11 | 2 |
| Z6 | 16 | 1 |

| G1 | | G2 | | | |
|---|---|---|---|---|---|
| 50 | 101 | 203 | 305 | 407 | 450 | KW
| 41 | 65 | 190 | 216 | 256 | 402 |
| 32 | 37 | 200 | 301 | 406 | 317 |
| 22 | 87 | 177 | 288 | 309 | 209 |
| 16 | 78 | 99 | 169 | 180 | 191 |
| 5 | 34 | 67 | 89 | 128 | 230 |

| 32 | 216 | G_KW
|---|---|
| 5 | 89 |

| 18 | 69 | 171 | 89 | 191 | 234 | V_KW
|---|---|---|---|---|---|
| 9 | 33 | 158 | 0 | 40 | 186 |
| 0 | 5 | 168 | 85 | 190 | 101 |
| 17 | 82 | 172 | 199 | 220 | 120 |
| 11 | 73 | 94 | 80 | 91 | 102 |
| 0 | 29 | 62 | 0 | 39 | 141 |

143.2

|    | Index 1 | Index 2 | Index 3 | Index 4 | Index 5 | Index 6 |
|----|---------|---------|---------|---------|---------|---------|
| Z6 | 50 | 47 | 44 | 47 | 42 | 39 |
| Z5 | 41 | 43 | 41 | 43 | 41 | 36 |
| Z4 | 32 | (301) | 38 | 39 | 35 | 33 |
| Z3 | 22 | 39 | 35 | 36 | (309) | 25 |
| Z2 | 16 | 36 | 33 | 29 | 28 | 24 |
| Z1 | 5 | 34 | 31 | 25 | 22 | 19 |

| Row | Index |     |
|-----|-------|-----|
| Z 4 | 2     | 301 |
| Z 3 | 5     | 309 |

|    | Index 1 | Index 2 | Index 3 | Index 4 | Index 5 | Index 6 |
|----|---------|---------|---------|---------|---------|---------|
| Z6 | 50 | 47 | 44 | 47 | 42 | 39 |
| Z5 | 41 | 43 | 41 | 43 | 41 | 36 |
| Z4 | 32 | 0 | 38 | 39 | 35 | 33 |
| Z3 | 22 | 39 | 35 | 36 | 0 | 25 |
| Z2 | 16 | 36 | 33 | 29 | 28 | 24 |
| Z1 | 5 | 34 | 31 | 25 | 22 | 19 |

METHOD FOR CORRECTING ERRORS IN POSITION-MEASURING DEVICES

CROSS-REFERENCE TO PRIOR APPLICATION

Priority is claimed to German Patent Application No. DE 10 2014 219 188.2, filed on Sep. 23, 2014, the entire disclosure of which is hereby incorporated by reference herein.

FIELD

The present invention relates to a method for correcting errors in position-measuring devices.

BACKGROUND

Known position-measuring devices typically include one or more material measures as well as one or more scanning units movable relative thereto. The material measures generally provided are linear scales or grid scales having corresponding gratings thereon. The sought position of the scanning unit relative to the material measure is determined by scanning the grating by means of the scanning unit. Known for this purpose are, addition to optical scanning principles, magnetic, inductive and capacitive scanning principles. The accuracy with which this position can be measured depends, inter alia, to a large extent on the accuracy of the grating on the material measure. In the case of optical scanning, such gratings can be produced with sufficient accuracy for normal measurement applications, so that no further corrections are necessary. However, in high-precision measurement applications, such as, for example, in lithography machines for wafer exposure, the position must be sensed with extreme accuracy, which typically requires further corrections.

In this connection, it is known to create correction tables for the individual material measures used, either during manufacture thereof or during special calibration procedures. Such correction tables specify the deviation between the position sensed by the scanning unit through scanning of the material measure and the physical position. In this regard, reference may be made, for example, to US 2008/105026 A1. In a first step during the actual measurement operation, an uncorrected position value is then determined by scanning the material measure by means of one or more scanning units. In another, additional correction step, a correction value from the correction table is combined with the measured uncorrected position value, for example added thereto or otherwise arithmetically combined therewith, in order to generate a corrected position value.

In such high-precision measurement applications, the position values generated by the position-measuring device are typically further processed in real time, for example, in a downstream control system for positioning a stage in a lithography machine. It is therefore required that the corrected position value also be generated in real time and with a minimum of additional processing time. Typically, in highly dynamic applications, only a few microseconds are available for this purpose.

Highly accurate position-measuring devices typically require positional resolutions of a few 10 picometers in such applications; i.e., the correction table used must also have this resolution. To provide a sufficient degree of accuracy, the correction values must be provided in the correction table with a correction pitch of about 0.1 mm-1 mm. In applications, where two-dimensional scale plates are used as material measures, the correction values must also be available in two-dimensional form for the entire measurement range. As a result, on the one hand, correction tables containing several millions of individual correction values are typically required and, on the other hand, 16 or more bits are needed for the binary representation of an individual correction value because of the required high positional resolution in the picometer range. Thus, the amount of memory required increases substantially with increasing size of such correction tables.

The position-measuring devices typically have signal-processing units associated therewith for processing the generated signals. Such signal-processing units may be placed near the scanning units, but also further away therefrom. In addition to various signal-processing elements, the signal-processing unit contains, inter alia, also the memory unit in which one or more correction tables are stored. These signal-processing units are often so-called "embedded systems," which are optimized for rapid calculation and transmission of the corrected position values to a control system via a high-speed interface. In the applications mentioned, the time between scanning and the transmission of the corrected position value should be as short as possible, typically in the range of a few microseconds. This can only be ensured by using digital signal processors or programmable logic elements in the signal-processing unit, to which memory units for the required correction tables can be connected only to a limited extent.

In such systems, the evaluation unit is often connected to a higher-level machine controller via a further interface, such as, for example, a suitable field bus. This interface is also used, inter alia, for transmitting the correction tables into the memory unit of the respective signal-processing unit. The interface used for this purpose is usually not designed as a high-speed interface; i.e., not for high data throughput. Frequently, a plurality of signal-processing units of a plurality of position-measuring devices are connected to the higher-level machine controller via this interface and, therefore, the transmission of a plurality of extensive correction tables to the different signal-processing units can take a considerable amount of time. During this period, the memory units containing the correction tables are not available for measurement value correction; i.e., for the measurement operation.

SUMMARY

In an embodiment, the present invention provides a method for correcting errors in position-measuring devices having material measures which are scanned by at least one scanning unit. Correction values are obtained in a calibration performed prior to a measurement operation. The correction values from the calibration are compressed for the measurement operation. The correction values are kept available for a defined number of correction points on the material measure and used during the measurement operation to correct acquired position values.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention provides a method for correcting errors in position-measuring devices that will place the least demands on the storage capacity of the associated signal-processing units with regard to the correction tables used and/or that will minimize the time for the transmission of such correction tables to the signal-processing unit of the position-measuring device.

An embodiment of the inventive method for correcting errors in position-measuring devices having material measures, which are scanned by at least one scanning unit, provides to keep correction values available for a defined number of correction points on the material measure. These correction values are obtained from a calibration performed prior to the measurement operation and are used during measurement operation to correct the acquired position values. The correction values obtained during calibration are compressed for the measurement operation.

For purposes of compression, it is possible to reduce either the number and/or the data word width of the correction values.

In order to compress the correction values obtained from the calibration, provision may be made that:
 correction values be selected and stored in a partial correction table only for a portion of the available correction points on the material measure, and
 correlation information be stored in a correlation table, the correlation information being used during measurement operation to correlate the correction values stored in the partial correction table with the correction points.

In this connection, correction values are preferably selected and stored in the partial correction table only for those correction points on the material measure that are located in a sub-area of the material measure that is scanned by the scanning unit during measurement operation.

The sub-area of the material measure or the material measure advantageously has a non-rectangular contour.

Moreover, the partial correction table and the correlation table may be stored in a memory unit that is accessed by a signal correction unit during measurement operation to correct the acquired position measurement values and make them available for further processing.

It may be provided that the correlation information stored in the correlation table indicate the respective storage location in the memory unit at which the correction values of the selected correction points are stored.

Moreover, during measurement operation, a correlation rule may be used to determine, for a given position on the material measure, the storage location of the correction value of at least one near or nearest correction point in the partial correction table.

Furthermore, in order to compress the correction data obtained from the calibration, it is also possible:
 to form a plurality of groups of locally adjacent correction points on the material measure, for which respective correction values are available from the calibration, and
 to determine a local group correction value for each group, and to store the group correction values in a group correction value table, and
 to arithmetically combine the correction values of each group that were obtained from the calibration with the respective associated group correction value, and to thereby generate calculated correction values of reduced data word width and store the same in a calculated correction value table, and
 to correct the acquired position values during measurement operation using the calculated correction value table and the group correction value table.

In this connection, the group correction value may be determined to be the lowest correction value in the group or the mean correction value in the group or the mean value of the maximum and minimum values of the correction values of a group.

Moreover, in order to arithmetically combine the correction values with the respective associated group correction value, a subtraction operation may be performed.

It may also be provided, in addition,
 to detect at least one extreme-value correction point on the material measure, whose associated correction value deviates by a defined amount from the correction values of the adjacent correction points, and
 to store in the calculated correction value table an auxiliary value instead of the correction value for the extreme-value correction point, and
 to store correlation information for the extreme-value correction point together with correction values of the extreme-value correction point in an extreme-value correction table, the correlation information being used to correlate stored correction values with extreme-value correction points during measurement operation.

The auxiliary value to be stored in the calculated correction value table may be a marker value that does not coincide with any other correction value.

Moreover, the correction value to be stored for the extreme-value correction point in the extreme-value correction table may be the correction value obtained from the calibration or a calculated extreme-value correction value.

The method according to an embodiment of the present invention has the particular advantage of enabling a significant reduction in the volume of the correction tables used. Therefore, less memory space must be provided, which in turn reduces the cost of such systems. Now, significantly more information can be placed in the same memory space when storing the correction tables. Any memory space that may not be needed may be used for other purposes in the signal-processing unit. In addition the reduced storage capacity requirements for the memory unit used, this also results, in particular, in significantly reduced transmission times when such correction tables are transmitted from a higher-level machine controller to the signal-processing unit within a shorter period of time. Furthermore, a capability for using correction tables may be implemented in existing systems in which this was heretofore not possible due to limited memory space.

Other details and advantages of the present invention are explained in the following description of exemplary embodiments of the inventive method in conjunction with the figures.

Figure 1:
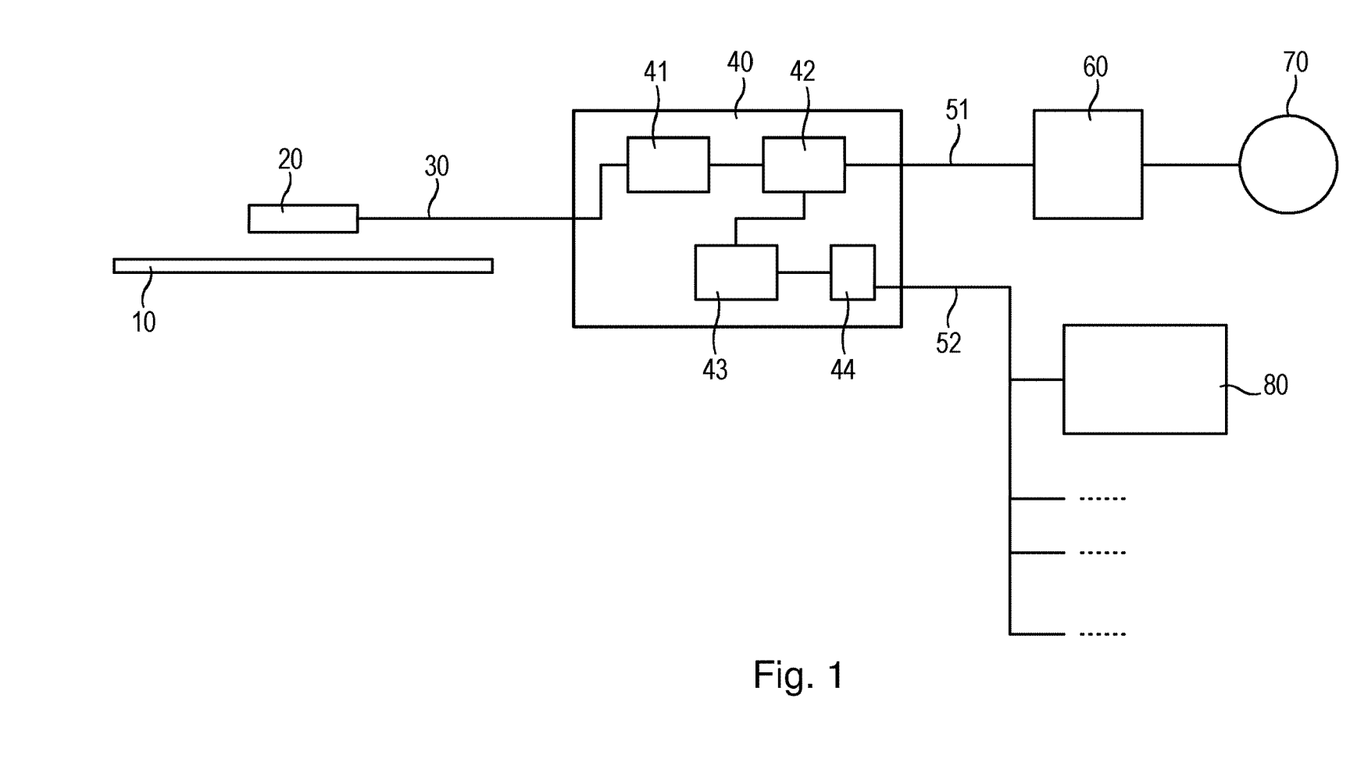
FIG. 1 is a highly schematic block diagram of a system including a position-measuring device and further components that is suitable for carrying out the method according to an embodiment of the present invention.
Figure 2:
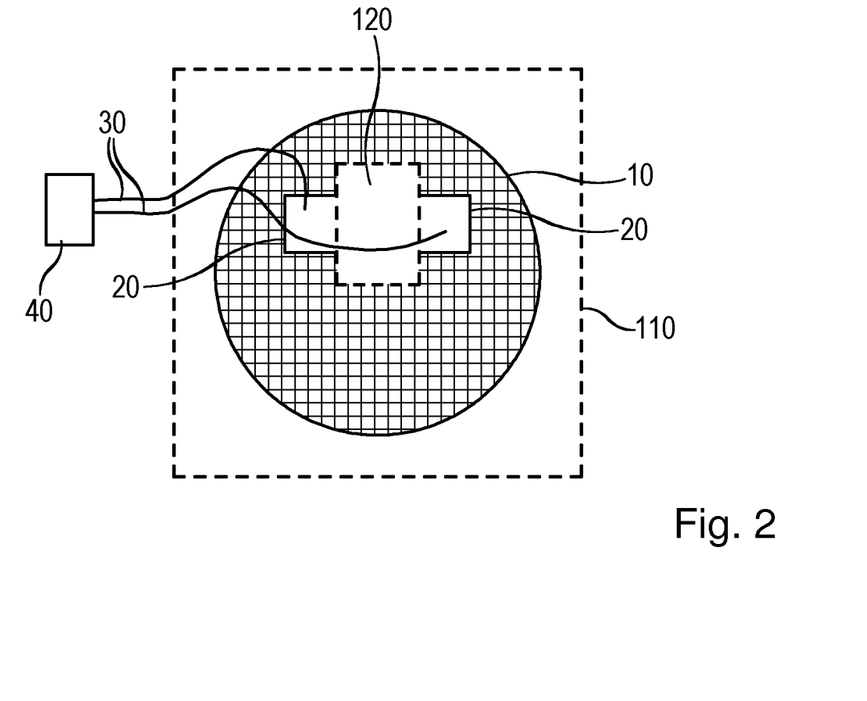
FIG. 2 is a highly schematic plan view of a portion of the two-dimensional material measure of the position-measuring device of FIG. 1.

FIG. 1 shows, in a highly schematic block diagram, a system including a position-measuring device and further components that is suitable for carrying out the method according to the present invention. FIG. 2 shows in plan view a portion of material measure 10 of this position-measuring device, including two scanning units 20.

The position-measuring device shown includes a material measure 10 and two scanning units 20 movable relative thereto. Material measure 10, on the one hand, and scanning units 20, on the other hand, are connected to machine components 110, 120 (indicated by broken lines in FIG. 2) that must be positioned relative to one another. These machine components may be the stationary machine frame 120 and a stage 110 of a semiconductor fabricating lithography machine, the stage being movable relative to the frame.

In the example shown, material measure 10 is configured as a two-dimensional material measure in the form of a reflection-type grid grating. The material measure is optically scanned by scanning units 20 to produce positional signals in response to a relative motion between material measure 10 and scanning units 20. With regard to a suitable scanning principle of the position-measuring device used, reference is made, for example, to the Applicant's patent application EP 1 762 828 A2. The scanning method disclosed therein offers the particularly advantageous possibility of acquiring position information regarding the relative motion of the machine components along two directions of movement simultaneously, using two scanning units. Of course, this scanning principle using two scanning units is not essential for the present invention; i.e. it is also possible to use a single scanning unit.

The plan view of FIG. 2 shows only that area of two-dimensional material measure 10 which is relevant for the present measurement task and which here is substantially circular in shape. In practice, however, the complete material measure 10 typically extends beyond this area. Depending on the measurement task, two-dimensional material measure 10 may be formed of a single or multiple parts.

The generated position signals are transmitted from scanning units 20 via a connecting line 30 to a downstream signal-processing unit 40, which may be disposed, for example, in the vicinity of the relatively movable components in the machine. Signal-processing unit 40 is essentially used to further process and convert the generated position signals into position values which are then passed or transmitted via a first interface 51 to a control unit 60. On its output side, control unit 60 controls a drive mechanism 70 used for positioning stage 110 in the machine.

In position determination unit 41, in a first processing step, an initially uncorrected position value is determined from the position signals from scanning units 20. The acquired position value is then passed to a signal correction unit 42 in which this position value is corrected by the correction values of the material measure 10 used, which are stored in a memory unit 43. Such correction may be accomplished, for example, by arithmetically combining the uncorrected position values in a suitable manner with the correction values stored in memory unit 43. The correction values are preferably stored as digital data words in memory unit 43. The correction values are obtained through suitable calibration or high-precision gauging of material measure 10 prior to the measurement operation, and are stored in compressed form in memory unit 43, as will be described in detail below. Then, the corrected position value is transmitted from signal correction unit 42 via first interface 51 to control unit 60. Since the positioning of the stage is a time-critical control task, first interface 51 is preferably designed as a high-speed interface capable of transmitting large volumes of data in a short period of time. Typical transmission times of first interface 51 are in the range of a few microseconds.

Moreover, signal-processing unit 40 is further provided with a monitoring unit 44 which performs the configuration and monitoring of signal-processing unit 40. The tasks of monitoring unit 44 further include the transmission of the correction values from machine controller 80 via a second interface 52 to memory unit 43. Second interface 52 is designed as a field bus via which machine controller 80 is also connected to other components in the machine. Such components may include, for example, additional position-measuring devices, control units, etc.

As mentioned earlier, the correction values obtained during calibration of material measure 10 for a defined number of correction points on material measure 10 are compressed in accordance with the present invention. This makes it possible, on the one hand, to reduce the expenditure for the required memory unit 43 in signal-processing unit 40. On the other hand, this makes it possible to significantly minimize the time required for transmitting the correction values from machine controller 80 via second interface 52 to memory unit 43. In this way, the dead times for the use of memory unit 43 can be significantly reduced. As will be explained in detail in the following description of exemplary embodiments of the method according to the present invention, provision is made to reduce the number and/or the data word width of the correction values in order to compress the same.

Figure 3:
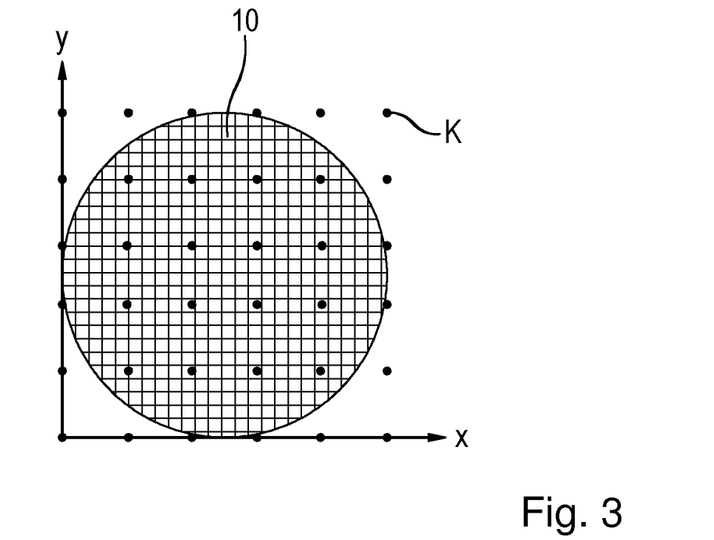
FIG. 3 is a schematic view of the two-dimensional material measure, showing also the correction points for which correction values were determined during a calibration operation.

During the calibration of the imperfect material measure 10 performed prior to the measurement operation, a raster of discrete correction points K is laid over material measure 10, as illustrated in the schematic view of FIG. 3 for material measure 10 of FIGS. 1 and 2. In the present example, correction points K are located in a raster with an equal spacing of 1 mm between adjacent correction points K on material measure 10. During calibration, a numerical correction value is determined for each of correction points K. During measurement operation, the respective acquired position value is arithmetically combined with this correction value to make a corrected position value available for further processing. The correction values are stored as digital data words having a defined data word width in a suitable correction table in memory unit 43.

In accordance with the prior art, the correction values are stored in two-dimensional matrices, where one matrix entry corresponds to one correction value at a specific xy position of material measure 10. The respective matrix is sequentially stored, for example, in a suitable memory unit. In the case of a high number of correction points K and a large data word width, this leads to the above-mentioned problems because of the resulting large data volumes. Storing correction points K in matrices has the advantage of easy and rapid processing in signal-processing unit 40. To be able to store all correction points K in the matrices, the matrices must be dimensioned to form a rectangle circumscribing all relevant correction points K'. If material measure 10 does not have a rectangular configuration, or if, in an application, scanning units 20 do not pass over the entire material measure 10 within a rectangular area, then the matrix contains correction points K that are not used in the application. Consequently, depending on the application, a substantial amount of memory may be unnecessarily occupied. Therefore, the present invention provides for the correction values to be compressed by reducing the number of stored correction values and/or the data word width. A first exemplary embodiment of the inventive method for compressing the correction values, which essentially allows for a significant reduction in the number of correction values to be stored, is described below in detail with reference to FIGS. 4a, 4b, 5a and 5b.

Here, for example, provision is made not to store all of the available correction values for all correction points K of material measure 10 in a memory unit, but rather to make a selection of correction values which belong only to a portion of all available correction values K' on material measure 10. The corresponding correction values of a portion of all available correction values are then stored in a partial correction table for material measure 10. Furthermore, for purposes of using the partial correction table during measurement operation, an additional table in the form of a correlation table is provided in which correlation information is stored which is used during measurement operation to correlate the correction values stored in the partial correction table with correction points K'.

In this connection, only the correction values of those correction points K' on material measure 10 are selected which lie in a sub-area B of material measure 10 that is actually scanned by scanning units 20 during measurement operation. Depending on the particular measurement task and the travel range of the movable object, material measure 10 may be scanned only in a sub-area B that is significantly smaller than the total extent of material measure 10. This situation is illustrated by way of example in FIG. 4a. Here, for example, only correction points K' located in an approximately triangular sub-area B of material measure 10 are selected and stored in a suitable partial correction table instead of storing all available correction values of all correction points in a complete correction table. This variant of the inventive method is generally particularly suitable for compressing the correction values when the particular measurement task allows selection of correction points K' from a sub-area B of material measure 10 that is non-rectangular in contour, or if material measure 10 has a non-rectangular contour. As can be seen from FIG. 4a, this approach reduces the number of correction values to be stored, and thus the resulting memory requirements in memory unit 43, to about one-half.

Figure 4A:
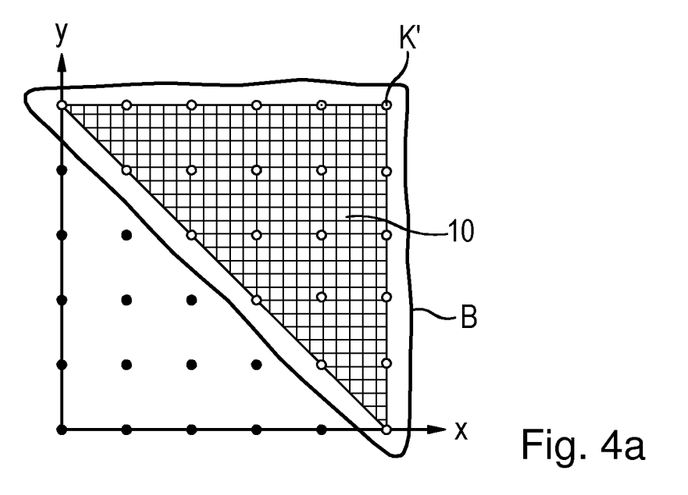
FIGS. 4a, 4b are schematic views of the two-dimensional material measure which serve to illustrate a first embodiment of the method according to the present invention.
Figure 4B:
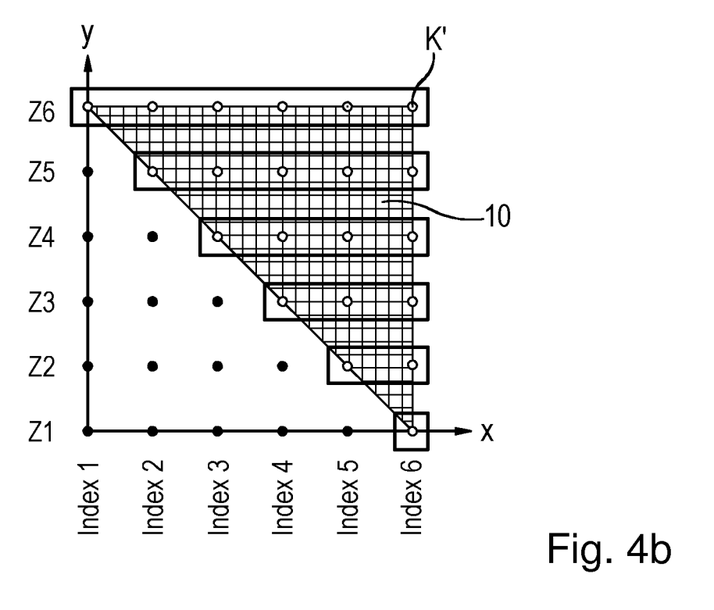
Figure 5A:
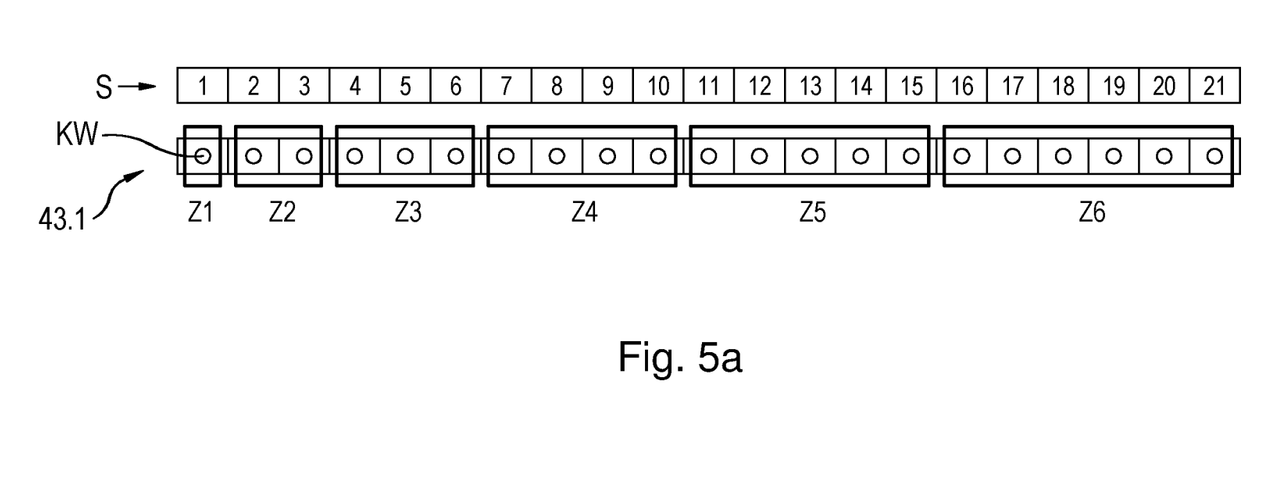
FIGS. 5a, 5b are schematic views to illustrate the storage of the correction data in the first embodiment of the method according to the present invention.

The storage of the correction values in partial correction table 43.1, and correlation table 43.2 provided for readout thereof in accordance with the first exemplary embodiment of the inventive method, will now be described by way of a greatly simplified example with reference to FIGS. 4b, 5a, 5b. In this connection, the selected correction values KW of correction points K' are successively stored, either row-by-row or column-by-column, in partial correction table 43.1 in memory unit 43 at the respective storage locations S 1-21. In FIG. 5a, this is illustrated schematically for the six rows Z1-Z6 from sub-area B containing the relevant correction values KW in accordance with FIG. 4b. From first row Z1, for example, only a single correction value KW is stored at storage location S=1 in partial correction table 43.1, whereas two correction values KW from second row Z2 are stored at storage locations S=2, S=3 in partial correction table 43.1, etc. Only these stored correction values KW belong to correction points K' from the sub-area B of material measure 10 that is relevant during measurement operation.

In FIG. 5a, the individual correction values KW are represented only schematically by a circle symbol. In reality, as mentioned earlier herein, correction values KW are digital data words having a predetermined data word width such as, for example, 16 or 32 bits. The data words each represent a numerical correction value KW for the associated correction point K' on material measure 10.

During measurement operation, due to the high time requirements to be met by the positioning control, it is then advantageous if the correction values KW associated with individual xy positions on material measure 10 can be determined from partial correction table 43.1 without much computational effort. To this end, signal correction unit 42 accesses partial correction table 43.1 stored in memory unit 43 and correlation table 43.2 to correct the acquired position values and make them available for further processing. For this purpose, in the present exemplary embodiment, the aforementioned correlation table 43.2 is provided which is also stored in memory unit 43 and the possible structure of which is schematically illustrated in FIG. 5b for the first exemplary embodiment of the inventive method.

Figure 5B:
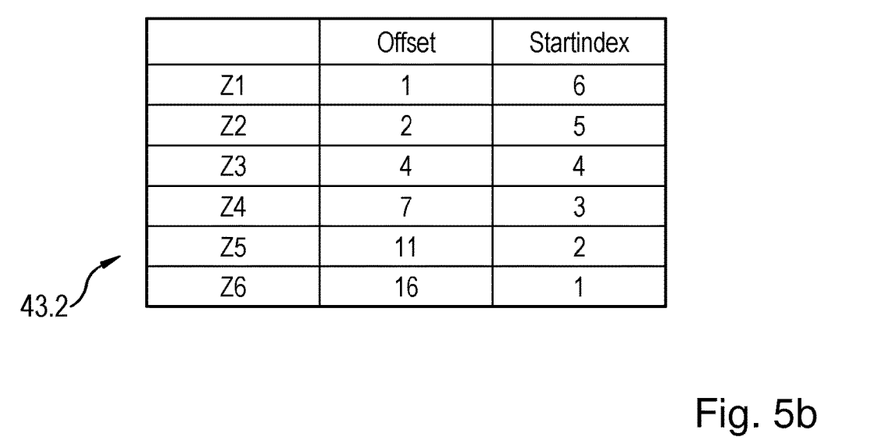

Correlation table 43.2 contains for each row Z1-Z6 of partial correction table 43.1 specific correlation information which, in the present example shown in FIG. 5b, are referred to as "offset" and "start index" and which are associated in columns with the individual rows Z1-Z6. The correlation information "offset" in each case indicates the storage location S in memory unit 43 or partial correction table 43.1 at which the first correction value of the respective row Z1-Z6 is stored as a digital data word. The correlation information "start index" stored in another column indicates which selected correction point K' in the respective row Z1-Z6 the first correction value KW of this row Z1-Z6 belongs to. As can be seen from FIG. 4b, the start index proceeds from left to right along the x-axis, starting at a start index value=1 and ending at a start index value=6.

During measurement operation, such a correlation table 43.2 makes it possible to uniquely determine a correction value KW for a given xy position on material measure 10 without much computational effort and to correct the acquired position value therewith. To this end, for a given position on material measure 10 having defined x and y coordinates, the storage location S of the correction value of at least one near or nearest correction point K' must be determined in the partial correction table. Alternatively, it is also possible to use a plurality, for example 4, of near or nearest correction points K' and interpolate them. The correction values of the plurality of correction points K' are them arithmetically combined to yield a correction value at the current position of material measure 10. In the present example, the corresponding correlation rule for a point having the coordinates x, y on material measure 10 is given the following relationship:

$$S(x,y) = \text{start address} + m - n + x \quad \text{(equation 1)}$$

where:

S(x, y):=storage location of a correction value in the partial correction table for a correction point on the material measure that is closest to a point having the coordinates x, y start address: storage location where the partial correction table stored in the memory unit begins m:=offset value for the rounded y-coordinate value from the correlation table n:=start index value for the rounded y-coordinate value from the correlation table x:=rounded x-coordinate value of the respective point For a point on the material measure having the coordinates x=5.4 mm; y=4.2 mm, the sought storage location S of the associated correction value KW in the partial correction table is derived for a start address=1000, m=offset values (y=4)=7, n=start index value(y=4)=3 as follows:

$$S(x=5.4 \text{ mm}; y=4.2 \text{ mm})=1000+7-3+5=1009$$

During measurement operation, signal correction unit 42 then accesses the correction value KW stored at this storage location in partial correction table 43.1 of memory unit 43 and arithmetically combines and corrects the acquired position value with this correction value KW.

In a modification of this exemplary embodiment, provision may be made to further reduce the size of correlation table 43.2. To this end, the two columns "offset" and "start index" of the correlation table 43.2 shown in FIG. 5b are combined into a single column by subtracting the values in the two columns as follows: OS=offset value−start index value, this single column then representing the only correlation information OS.

In the present example, the corresponding correlation rule for storage location S of the correction value for a point having the coordinates x, y on material measure 10 is then derived according to the following relationship 2:

$$S(x,y)=\text{start address}+O+x \quad \text{(equation 2)}$$

where:

S(x, y):=storage location of a correction value in the partial correction table for a correction point on the material measure that is closest to a point having the coordinates x, y start address: storage location where the partial correction table stored in the memory unit begins O:=correlation information for the rounded y-coordinate value from the correlation table x:=rounded x-coordinate value of the respective point.

Thus, the correlation table provided in addition to the partial correction table may be embodied in different ways in this embodiment of the method according to the present invention.

The memory required for correction values KW compressed in this manner is considerably reduced as compared to uncompressed storage of all available correction values KW. In the described example, in which correction values KW are from a triangular sub-area B that makes up only about half of the complete material measure 10, the resulting memory requirements are just under half of those for all of the correction values KW plus the small amount of memory needed for correlation table 43.2.

Another, second exemplary embodiment of the inventive method will be described with reference to FIGS. 6 and 7a-7c. In this embodiment, compression of the correction values is essentially accomplished by reducing the data word width of the correction values. Again, the system illustrated in FIG. 1 is suitable for carrying out the corresponding method.

This exemplary embodiment of the corresponding method is based on the realization that the correction values within a limited spatial area on the material measure typically differ only slightly. This means that within this area, the correction values of the correction points cover only a relatively small range of values. In the present second exemplary embodiment of the inventive method, this fact is exploited to reduce the data word width of the correction values in a correction table, and thus the memory space required.

Figure 6:
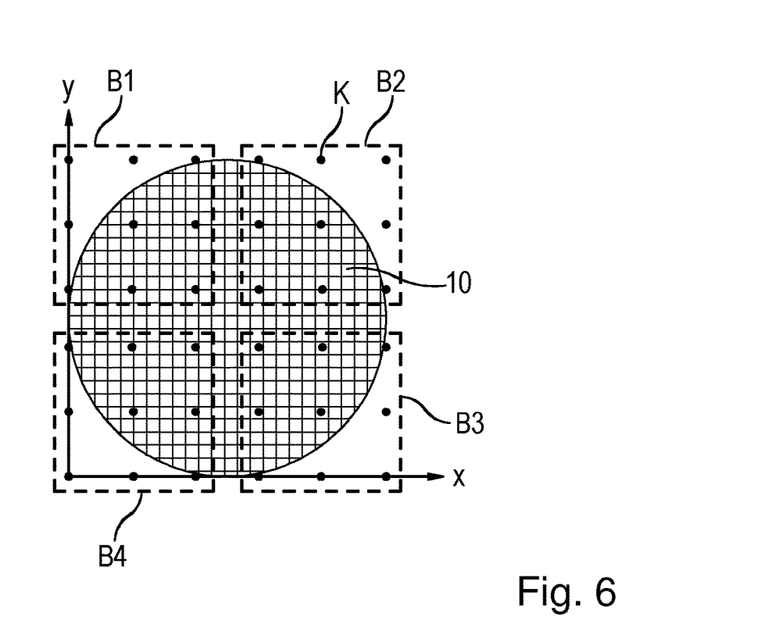
FIG. 6 is a schematic view of the two-dimensional material measure which serves to illustrate a second embodiment of the method according to the present invention.

To this end, as shown in FIG. 6, material measure 10 is divided into a plurality of equally sized sub-areas B1-B4, each containing the same number of correction points K for which correction values were determined during the preceding calibration. The correction values determined during calibration are taken to have a data word width of, for example, 16 bits or 2 bytes. Accordingly, a plurality of groups of locally adjacent correction points K for which correction values are available from the calibration are formed on material measure 10. In the example shown in FIG. 6, the division is into four groups, each containing 9 correction points K.

Then, a local group correction value is generated for each group, respectively for each sub-area B1-B4 on material measure 10, from the determined correction values of this group, and the group correction values are subsequently stored in memory unit 43. The group correction value may be generated or determined in different ways, such as, for example, as a mean value of the maximum and minimum values of the correction values of a group, as a mean value of all of the correction values of a group, or as the lowest correction value of a group, etc.

After that, the correction values of each group that were obtained from the calibration are arithmetically combined with the associated group correction value, thereby generating calculated correction values for each correction point K. The calculated correction values so obtained each have a smaller data word width than the original correction values from the calibration. The arithmetic combination is preferably effected by calculating the difference between the correction values from the calibration and the respective group correction values. The calculated correction values generated in this manner have a reduced data word width of, for example, only 8 bits or 1 byte and are then stored in a calculated correction value table in memory unit 43. During measurement operation, the calculated correction value table and the group correction value table are used to correct the acquired position values in signal correction unit 42.

Accordingly, the volume of data required for correction can be considerably reduced by this approach as well. As explained by way of example, the data word width in the calculated correction value table can be reduced by half. When sub-areas B1-B4 are selected sufficiently large, the additionally required group correction value table does not significantly increase the volume of data required for correction, even if the data word width provided in the group correction value table is still 16 bits.

The second exemplary embodiment of the method according to the present invention is further described below reference to FIGS. 7a-7c.

Figure 7A:
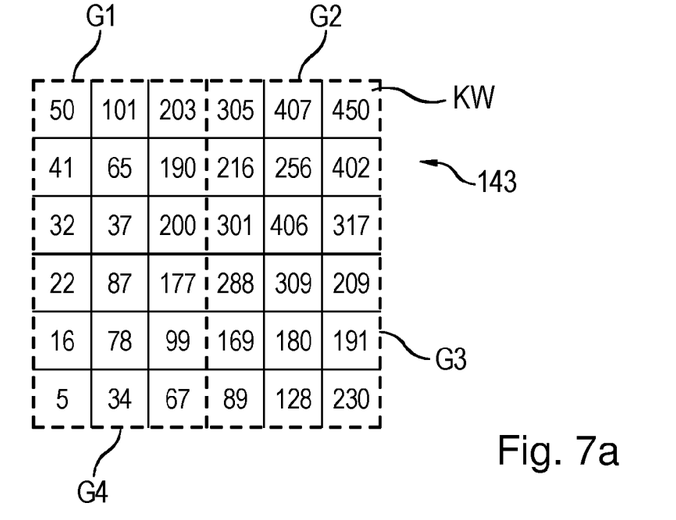
FIGS. 7a, 7b, 7c are further schematic views to illustrate the second embodiment of the method according to the present invention.
Figure 7B:
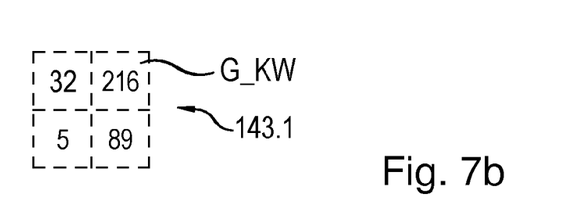

FIG. 7a shows a correction table 143 containing correction values KW obtained during the calibration of material measure 10. 36 numerical correction values KW were determined for the total of 36 correction points on the material measure. During measurement operation, the obtained position values must be arithmetically combined with these numerical correction values KW. In the example shown, the numerical correction values KW span the range [5; 450]. In order to cover this value range using digital data words, 16-bit (2-byte) data words are needed. Using 8-bit (1-byte) data words, only the value range [0; 255] could be covered. Accordingly, in this greatly simplified example, a memory of 72 bytes (36·2 bytes) would be required for the uncompressed correction table 143.

As illustrated in FIG. 7a, four groups G1-G4 of correction values KW are formed which belong to respective locally adjacent correction points K on the material measure and which, in FIG. 6, are located in the equally sized sub-areas B1-B4 on material measure 10. Then, in each of the four groups, the lowest correction value KW within the respective group is determined as the group correction value G_KW. Accordingly, group correction value G_KW for group G1 is 32, group correction value G_KW for group G2 is 216, etc. The four group correction values G_KW so obtained are then stored in group correction value table 143.1, as schematically illustrated in FIG. 7b.

Figure 7C:
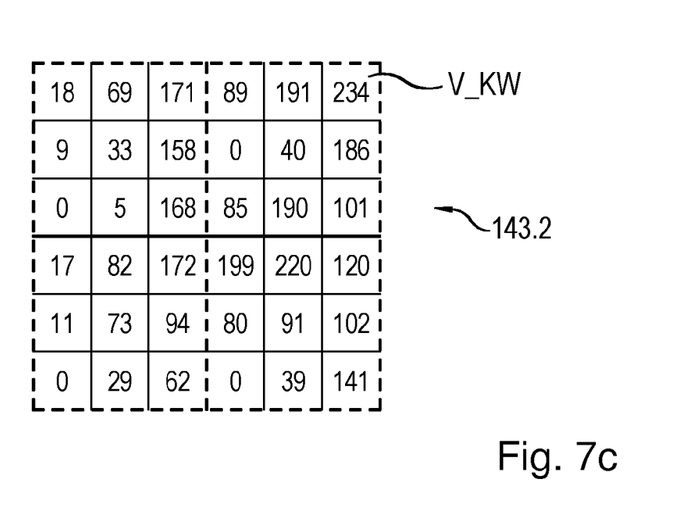

Calculated correction value table 143.2, schematically illustrated in FIG. 7c, is then generated by arithmetically combining each correction value KW from the original correction table 143 with the associated group correction value G_KW from group correction value table 143.1. The arithmetic combination is a subtraction operation. Accordingly, calculated correction value V_KW=18 determined at the top left in FIG. 7c is derived as V_KW=KW−G_KW=50−32. The remaining calculated correction values V_KW in calculated correction value table 143.2 are generated analogously.

The calculated correction values V_KW so obtained in calculated correction value table 143.2 now span only the value range [0; 234] and can be stored as 8-bit data words in memory unit 43, and thus require significantly less memory space than the original correction table 143 from FIG. 7a. In memory unit 43, altogether, a memory of 36 bytes (36·1 byte) is needed for calculated correction value table 143.2 and a memory of 8 bytes (4·2 bytes) is needed for group correction value table 143.1, which makes a total of 44 bytes of required memory as compared to 72 bytes of memory required for the uncompressed correction table 143. In the real case of very large correction tables and several millions of correction values, this advantage obviously has a significantly greater effect than in the present, greatly simplified example.

The above-described creation or generation of group correction value table 143.1 and calculated correction value table 143.2 may be performed both in and outside of signal-processing unit 40. In the latter case, the time required for transmitting the corresponding tables to memory unit 43 in signal-processing unit 40 is, of course, reduced due to the smaller data volume.

A modified first variant of the second embodiment of the inventive method, which may be used in conjunction with the previously described method, is described below with reference to FIGS. 8a-8c.

It may generally occur that, at individual correction points of the material measure used, the correction values determined during calibration differ greatly from the remaining correction values. Such points will be referred to as extreme-value correction points hereinafter. These may be caused, for example, by singular defects in the material measure, such as, for example, pores, in the material measure. Although generally only very few such extreme-value correction points will occur, this has the result that effective reduction of the data word width is not possible when compressing the correction values in accordance with the second exemplary embodiment. Rather, due to the extreme-value correction points and the associated correction values, a large value range would still have to be covered for the correction values in the calculated correction value table. Therefore, a substantial reduction of the memory required in memory unit 43 would not be possible without additional measures.

For this reason, in the first variant of the second embodiment of the inventive method, provision is made to initially detect such extreme-value correction points on the material measure. This may be done, for example, by checking if the correction values of the different correction points differ by a certain predetermined amount from the correction values of the adjacent correction points.

Once the existing extreme-value correction points are detected in this manner, an auxiliary value is stored at each of these extreme-value correction points in the correction value table obtained from the calibration. This auxiliary value may be, for example, a predetermined fixed value which otherwise does not occur as a correction value; i.e., does not coincide with any other correction value in the calculated correction value table.

The actual correction value for the detected extreme-value correction point $K_X$ is stored in an additional extreme-value correction table to be available as needed for correction of position values during measurement operation. Also stored in the extreme-value correction table together with the correction value of the detected extreme-value correction point is correlation information indicating which correction point in the correction table the respective correction value belongs to. In this connection, the actual correction value obtained from the calibration may be stored in the extreme-value correction table as the correction value for the extreme-value correction point. However, alternatively, a calculated extreme-value correction value, which may be generated, for example, from the difference between the correction value at the extreme-value correction point and a local correction value, may be stored at this location.

During measurement operation, the correction value from the extreme-value correction table is then used for the extreme-value correction point, if necessary, for correction of position values.

A greatly simplified example of this first variant of the second embodiment of the inventive m is further described below reference to FIGS. 8a-8c.

Figure 8A:
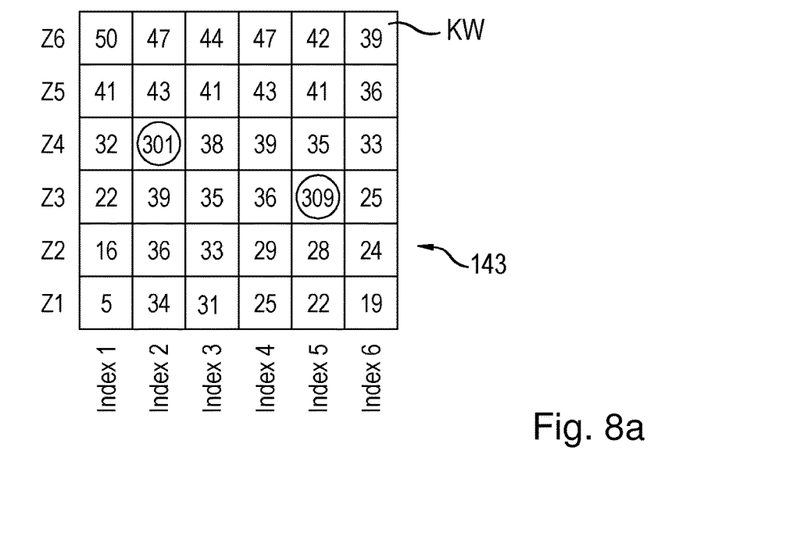
FIGS. 8a, 8b, 8c are further schematic views to illustrate a first variant of the second embodiment of the method according to the present invention.

FIG. 8a shows the correction values KW that were determined for 36 correction points during calibration of a two-dimensional material measure, and which are stored in uncompressed form in the correction table 143 obtained during calibration. As can be seen, the correction values KW=301 and KW=309 at the marked positions Z4/index 2 and Z3/index 5 differ significantly from the adjacent correction values KW, and thus are correction values for extreme-value correction points.

Here, application of the above-described second embodiment of the inventive method would not lead to the desired reduction of the data word width for the stored correction values KW, because the second embodiment relies on the assumption that adjacent correction values KW do not differ greatly from one another. Thus, compression of correction values KW would not be possible without additional measures because 16-bit data words would still be needed for the entire value range of correction values KW.

Figure 8B:
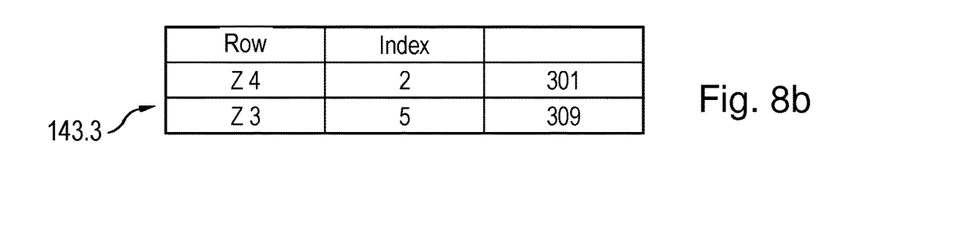
Figure 8C:
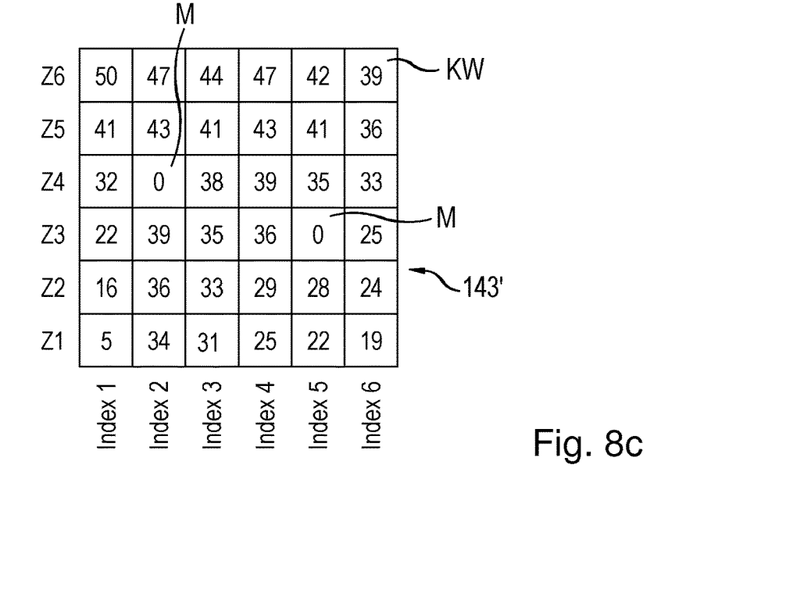

Therefore, an extreme-value correction table 143.3, shown in highly schematic form in FIG. 8b, is created after the two extreme-value correction points have been determined. In this table, the two correction values for the two extreme-value correction points are stored in the third column, while the correlation information items "row" and "index" are stored in the two preceding columns. "Row" and "index" characterize the correlation between the two extreme-value correction points and the corresponding correction points on the material measure in accordance with the correction table of FIG. 8a.

In the correction table that forms the basis for the further procedure in accordance with the second exemplary embodiment, the correction values at the two extreme-value correction points are replaced with suitable marker values M. This is illustrated in FIG. 8c, which shows the modified correction table 143' and in which each of the correction values KW at the two extreme-value correction points were replaced with the marker value M=0. The values for marker value M should be selected such that they do not coincide with any other correction value KW in modified correction table 143'.

During measurement operation, signal correction unit 42 then initially accesses only modified correction table 143' and checks if the values recorded therein coincide with a marker value M. If this is the case, extreme-value correction table 143.3 is accessed to determine the actual correction value KW and further process it.

In addition to the above-described first variant of the second embodiment of the inventive method, there exist further modifications or variants of this embodiment, some of which will be briefly outlined below.

For example, in another variant, modified correction table 143' of the aforedescribed first variant of the second embodiment of the inventive method may be further compressed. This may be accomplished by applying the above-described procedure according to the second embodiment of the inventive method to modified correction table 143'. That is, a plurality of groups of correction values are formed within modified correction table 143', group correction value are determined and stored in group correction value tables, etc. This allows the data word width to be further reduced.

As an alternative to the procedure described with reference to FIGS. 8a-8c, it is possible in another variant to store, at the extreme-value correction points in modified correction table 143', a fraction of the correction value determined for the respective extreme-value correction point instead of a marker value. This fraction will hereinafter be referred to as first fractional correction value. The remaining fraction of the correction value, called second fractional correction value hereinafter, is stored in extreme-value correction table 143.3. During measurement operation, the signal correction unit then checks for each correction point whether an extreme value exists, using extreme-value correction table 143.3. If this is the case, then the correction value for such an extreme-value correction point is derived by summation of the first and second fractional correction values stored in the respective correction tables 143', 143.3.

In a further variant of the second embodiment of the inventive method, if exceptionally deviating correction values KW should exist not only at individual extreme-value correction points, but in a limited area of correction points on the material measure, an additional extreme-value correction table may be provided for each such limited area. In the additional extreme-value correction tables, the correction values are then stored as data words with a large data word width. In the actual correction table, suitable marker values are then entered again instead of the correction values for the respective areas.

In addition to the exemplary embodiments and different variants thereof specifically described herein, other embodiments are, of course, possible within the scope of the present invention.

For example, it is also possible to combine the first and second embodiments of the method according to the present invention. In this case, it would be possible, for example, to initially choose a procedure in accordance with the second described embodiment, and to determine group correction values for respective sub-areas and store them in a group correction value table. Thus, a typically rectangular area of the material measure is covered the group correction value table. Then, following the procedure of the first described exemplary embodiment, only a portion of all available correction points is selected and a partial correction table as well as a correlation table are created. During measurement operation, first the procedure of the first described exemplary embodiment is used, whereby the partial correction table and the correlation table are evaluated. Subsequently, the group correction value is used in an arithmetic combination in accordance with the second exemplary embodiment.

Moreover, in addition to or in combination with the above-described variants of the inventive method, it is also possible to use data compression techniques known from image processing applications. Thus, in a preprocessing step, it would be possible, for example, to compress the existing correction table using a lossy data compression technique and create a compressed correction table using a known JPG compression technique, for example. A high compression rate of, for example, a factor of 10 can already be achieved at the expense of the resulting loss of accuracy. Then, similar to the above-described second embodiment of the inventive method, the difference between the original correction table and the compressed correction table is calculated and stored as a differential correction table. Since the compressed correction table usually differs only slightly from the original correction table, the value range required for the differential correction table is small; i.e., the differential correction table can be stored using a small data word width and a correspondingly small amount of memory. Then, during measurement operation, the signal correction unit initially takes a correction value from the compressed correction table and then adds the associated correction value from the differential correction table thereto.

Further, the present invention is not limited to the use of two-dimensional reflective material measures. The methods described could, of course, also be used to compress correction values for unidirectional material measures, rotary material measures or transmissive material measures.

Finally, it would also be possible to use the inventive method in conjunction with position-measuring devices that are based on non-optical scanning principles, for example, in magnetic, inductive or capacitive position-measuring devices.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for correcting errors in position values generated by a position-measuring device having a material measure which is scanned by at least one scanning unit, the method comprising:
obtaining correction values for a defined number of correction points on the material measure in a calibration performed prior to a measurement operation;
compressing the correction values from the calibration for the measurement operation; and
using the compressed correction values during the measurement operation to correct the position values generated by the position-measuring device.

2. The method as recited in claim 1, wherein the correction values are in a form of digital data words, and wherein, for purposes of compression, at least one of a number and a data word width of the data words is reduced.

3. The method as recited in claim 1, wherein, in order to compress the correction values obtained from the calibration, the method further comprises:
selecting and storing the correction values in a partial correction table only for a portion of available correction points on the material measure; and
storing correlation information in a correlation table, the correlation information being used during the measurement operation to correlate the correction values stored in the partial correction table with the portion of the available correction points.

4. The method as recited in claim 3, wherein the correction values are selected and stored in the partial correction table only for the correction points on the material measure that are located in a sub-area of the material measure that is scanned by the scanning unit during the measurement operation.

5. The method as recited in claim 4, wherein the sub-area of the material measure has a non-rectangular contour, or the material measure has a non-rectangular contour.

6. The method as recited in claim 3, wherein the partial correction table and the correlation table are stored in a memory unit that is accessed by a signal correction unit during the measurement operation to correct the acquired position values and make the acquired and corrected position values available for further processing.

7. The method as recited in claim 6, wherein the correlation information stored in the correlation table indicates respective storage locations in the memory unit at which respective ones of the correction values of selected correction points are stored.

8. The method as recited in claim 7, wherein, during the measurement operation, a correlation rule is used to determine, for a given position on the material measure, the storage location of the correction value of at least one near or nearest correction point in the partial correction table.

9. The method as recited in claim 2, wherein, in order to compress the correction values obtained from the calibration, the method further comprises:
forming a plurality of groups of locally adjacent correction points on the material measure, for which respective correction values are available from the calibration;
determining, for each of the groups, a local group correction value, and storing the local group correction values in a group correction value table;
arithmetically combining the correction values of each of the groups that were obtained from the calibration with the respective associated local group correction value so as to generate calculated correction values of reduced data word width;
storing the calculated correction values in a calculated correction value table; and
correcting the acquired position values during the measurement operation using the calculated correction value table and the group correction value table.

10. The method as recited in claim 9, wherein the each of the local group correction values is determined to be a lowest correction value in the respective group, a mean correction value in the respective group or a mean value of maximum and minimum values of the correction values of the respective group.

11. The method as recited in claim 9, wherein, in order to arithmetically combine the correction values with the respective associated local group correction value, a subtraction operation is performed.

12. The method as recited in claim 9, further comprising:
detecting at least one extreme-value correction point on the material measure, whose associated correction value deviates by a defined amount from the correction values of adjacent correction points;
storing an auxiliary value in the calculated correction value table for the at least one extreme-value correction point instead of the correction value; and
storing correlation information for the at least one extreme-value correction point together with the correction value of the at least one extreme-value correction point in an extreme-value correction table, the correlation information being used to correlate the stored correction value with the at least one extreme-value correction point during the measurement operation.

13. The method as recited in claim 12, wherein a marker value that does not coincide with any of the correction values is stored as the auxiliary value in the calculated correction value table.

14. The method as recited in claim 12, wherein the correction value obtained from the calibration for the at least one extreme-value correction point or a calculated extreme-value correction value is stored in the extreme-value correction table as the correction value for the at least one extreme-value correction point.

15. A position-measuring device having at least one scanning unit configured to scan a two-dimensional material measure, the position-measuring device being configured to:
obtain correction values for a defined number of correction points on the material measure in a calibration performed prior to a measurement operation;

compress the correction values from the calibration for the measurement operation; and use the compressed correction values during the measurement operation to correct position values generated by the position-measuring device.

* * * * *